Figure 1:
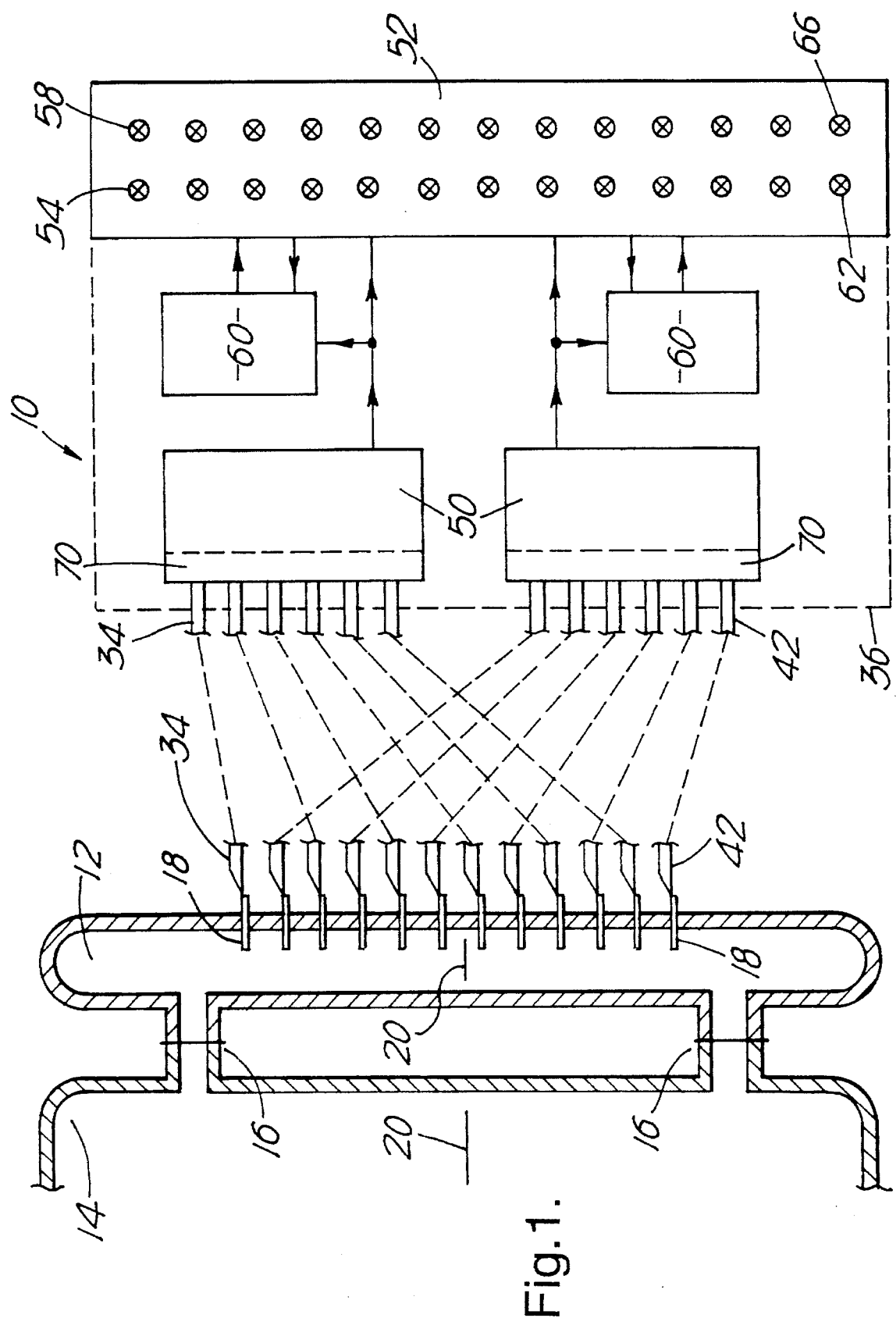

United States Patent

Richards et al.

[11] Patent Number: 5,565,851
[45] Date of Patent: Oct. 15, 1996

[54] FLUID LEVEL SENSING SYSTEMS

[75] Inventors: Paul N. Richards, Basingstoke; Stephen P. Howse, Farnborough, both of England

[73] Assignee: Solartron Group Limited, England

[21] Appl. No.: 588,223

[22] Filed: Jan. 18, 1996

Related U.S. Application Data

[63] Continuation of Ser. No. 216,133, Mar. 22, 1994.

[30] Foreign Application Priority Data

Mar. 27, 1993 [GB] United Kingdom ............ 9306417

[51] Int. Cl.⁶ .................................................. G08B 21/00
[52] U.S. Cl. .................... 340/612; 340/618; 340/620; 340/661; 340/511; 340/521; 73/304 R; 73/290 R; 137/558
[58] Field of Search .................................. 340/506, 612, 340/517, 618, 620, 621, 622, 661, 870.13, 657, 511, 662, 664, 521, 518, 663; 73/304 R, 290 R; 137/558

[56] References Cited

U.S. PATENT DOCUMENTS

| | | | |
|---|---|---|---|
| 4,020,488 | 4/1977 | Martin et al. | 340/620 |
| 4,371,790 | 2/1983 | Manning et al. | 340/620 |
| 4,652,821 | 3/1987 | Kreft | 340/370.13 |
| 4,875,197 | 12/1989 | Rietsch | 340/870.13 |
| 5,220,514 | 6/1993 | John | 340/620 |
| 5,325,086 | 6/1994 | Thomas | 340/620 |

FOREIGN PATENT DOCUMENTS

| | | |
|---|---|---|
| 1056032 | 1/1967 | United Kingdom . |
| 1498399 | 1/1978 | United Kingdom . |
| 2072851 | 10/1981 | United Kingdom . |

Primary Examiner—Jeffery Hofsass
Assistant Examiner—Benjamin C. Lee
Attorney, Agent, or Firm—Lerner, David, Littenberg, Krumholz & Mentlik

[57] ABSTRACT

A fluid level sensing system, particularly for sensing the water level in a steam generating boiler, comprises a vessel connected to the boiler so as to contain water and steam at substantially the same level as in the boiler, a number of vertically spaced electrodes projecting into the vessel, and circuitry for measuring the electrical impedance sensed by each electrode. The circuitry, which can be multiplexed to each electrode in turn, includes a first comparator for producing an output when the sensed impedance lies between the normal maximum impedance of the water and the normal minimum impedance of the steam above the water, this output being demultiplexed to drive a vertical display to show the level of the steam/water interface. The circuitry additionally includes a second comparator for producing a further output when the sensed impedance lies below the normal minimum impedance of the water, which further output is indicative of a variety of different fault conditions and drives a fault indicator.

9 Claims, 2 Drawing Sheets

FLUID LEVEL SENSING SYSTEMS

This is a continuation of application Ser. No. 08/216,133 filed Mar. 22, 1994.

This invention relates to fluid level sensing systems, and is more particularly but not exclusively concerned with boiler water level sensing systems of the general kind disclosed in United Kingdom Patents Nos 1 056 032 and 1 438 271.

Boiler water level sensing systems of the kind described in United Kingdom Patents Nos 1 056 032 and 1 438 271 typically comprise a vertically extending cylindrical pressure vessel, sometimes called a "water column", adapted to be connected near its top and near its bottom to one end of a boiler, such that the water level in the pressure vessel is substantially the same as the water level in the boiler. A plurality of vertically spaced electrodes sealingly project into the pressure vessel, and are used to sense the electrical impedance of the fluid in the pressure vessel at the respective level of each electrode. Since the minimum electrical impedance of steam is significantly greater than the maximum electrical impedance of water, the position of the water/steam interface can readily be established. Systems of this kind are currently commercialised by the Applicant under the trade mark HYDRASTEP.

In high pressure steam generating plant using such a boiler to generate steam to drive a steam turbine, an exceptional degree of reliability is required. This is because failure of the water level sensing system can lead either to extensive damage to the boiler, which can be extremely expensive, or to water ingress into the steam turbine, which can be catastrophic, even leading in extreme cases to loss of life. At the same time, however, it is important that the water level sensing system should not give erroneous warning signals resulting in unnecessary plant shutdown, since such shutdowns are also very expensive.

To this end, current systems are provided with validation circuitry which provides a fault indication if, for example, water is apparently detected above steam. Additionally, the impedance measuring (or discrimination) circuitry associated with the upper electrodes, which are normally in steam, is arranged such that the most commonly experienced failure modes lead to a water indication, while the impedance measuring (or discrimination) circuitry associated with the lower electrodes, which are normally in water, is arranged such that the most commonly experienced failure modes lead to a steam indication. This, in combination with the validation circuitry, provides excellent reliability and fault detection, but means that two different kinds of impedance measuring circuitry are required, and that failures of the middle few electrodes, which can normally be either in water or in steam, and their associated impedance measuring circuitry may not be detected.

It is an object of the present invention to alleviate this problem.

According to the present invention, there is provided a fluid level sensing system for sensing the level of the interface between a first fluid and a second fluid, the first fluid being beneath and of lower electrical impedance than the second fluid, the system comprising a vessel for containing the fluids, at least one sensor for sensing the electrical impedance of the fluid at a predetermined level in the vessel, and first comparator means for producing a first output signal when the sensed impedance falls below a first predetermined value lying between the normal minimum electrical impedance of the second fluid and the normal maximum electrical impedance of the first fluid, further comprising second comparator means for producing a second output signal when the sensed impedance falls below a second predetermined value lower than the normal minimum electrical impedance of the first fluid, said second output signal being indicative of a fault condition.

In a preferred embodiment of the invention, the system comprises a plurality of said sensors vertically spaced apart within the vessel. In this case, the system may comprise respective first and second comparator means associated with each of said sensors. Alternatively, the system may comprise one first and one second comparator means, and mutiplexing means for multiplexing the first and second comparator means between the sensors on a time multiplexed basis, or more advantageously, two first and two second comparator means, first multiplexing means for multiplexing one first comparator means and its associated second comparator means between the sensors of a first group of sensors on a time multiplexed basis, and second multiplexing means for multiplexing the other first comparator means and its associated second comparator means between the remaining sensors on a time multiplexed basis, the sensors of the first group comprising every alternate one of the vertically spaced sensors.

Each of said sensors advantageously comprises electrode means defining a predetermined gap bridged by the fluid in the vessel at the level of the gap. In this case, the system preferably comprises a respective reference impedance for each electrode means, and at least one reference signal source for applying an AC reference signal via each reference impedance to the electrode means associated with that reference impedance, whereby the reference impedance and the fluid in the gap of the associated electrode means form a potential divider.

The reference impedances, the or each reference signal source, the comparator means and the multiplexing means (if present) are preferably disposed in a housing remote from the electrode means, in which case each reference impedance is advantageously connected to an input terminal of its associated electrode means by a respective first wire, and each such input terminal is connected back to its associated comparator means or to a respective input of the or the respective multiplexing means by a respective second wire. As a result of this "two wire per electrode means" arrangement, the or each second comparator means will produce its fault-indicative output signal upon the occurrence of any of the following events:

a) short-circuiting of the gap of the associated electrode means, or short-circuiting of either of the first and second wires of the associated electrode means to ground, where such short-circuiting creates an impedance lower than said second predetermined value; or b) breakage of either of the first and second wires of its associated electrode means.

Figure 2:
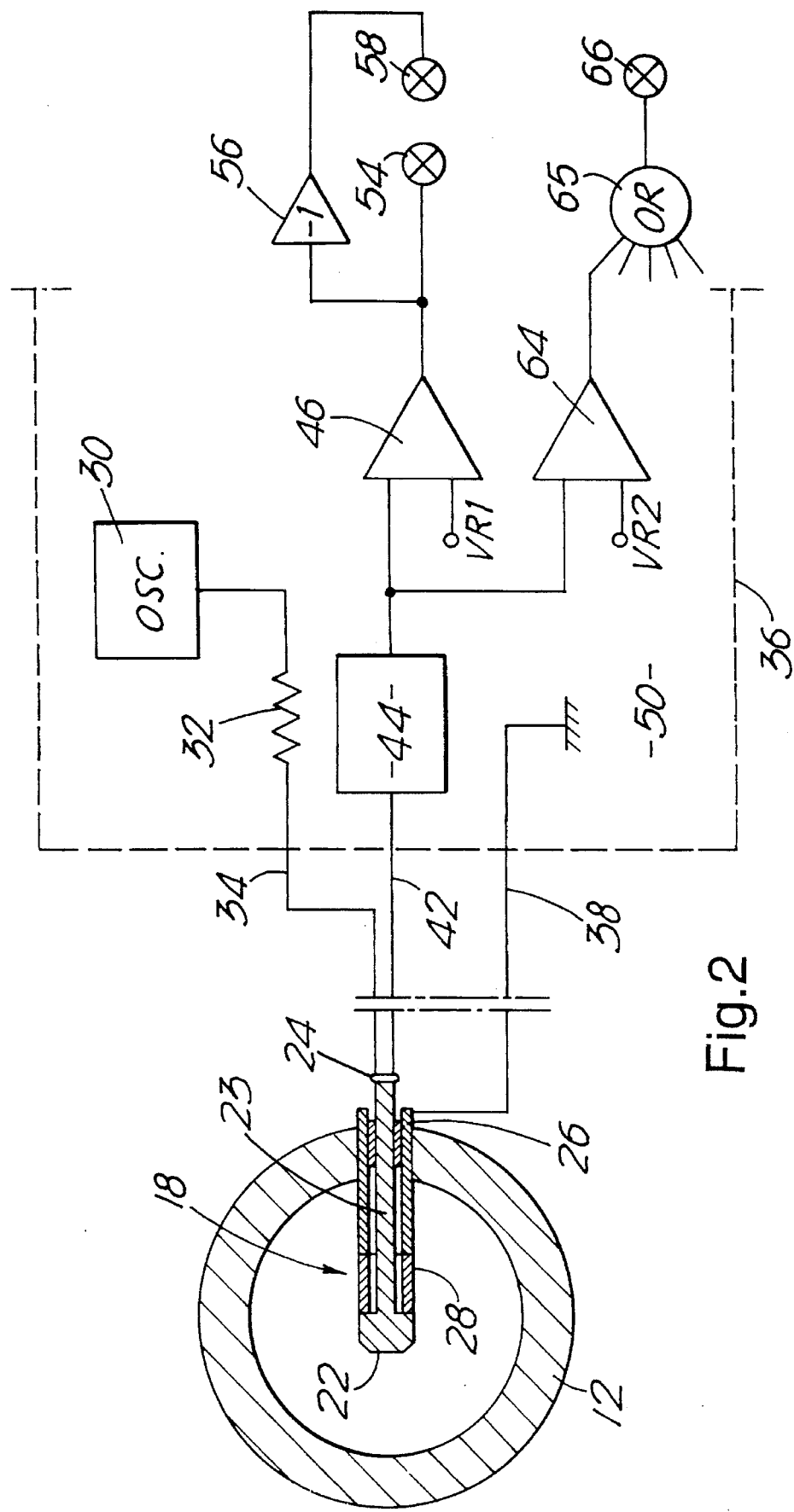

The invention will now be described, by way of example only, with reference to the accompanying drawings, of which:

FIG. 1 is a schematic block diagram of a boiler water level sensing system in accordance with the present invention; and FIG. 2 is a somewhat diagrammatic, part sectional, view of part of the boiler water level sensing system of FIG. 1.

The boiler water level sensing system shown in FIG. 1 is indicated generally at 10, and comprises an elongate cylindrical pressure vessel 12 which in use is coupled to one end of a boiler 14 by upper and lower pipe couplings 16 adjacent the top and bottom respectively of the vessel, so that the water level in the vessel is substantially the same as the water level in the boiler. A plurality of vertically-spaced electrodes 18, typically twelve, project sealingly into the pressure vessel 12 between the couplings 16, the electrodes being substantially symmetrically distributed above and below the normal water level 20 in the vessel (which is of course substantially the same as the normal water level in the boiler 14).The couplings 16 typically include shut-off cocks and drain valves (not shown) to facilitate removal of the electrodes 18 from the pressure vessel 12 for maintenance and/or replacement.

Each electrode 18 may be substantially as described in our United Kingdom Patent No 2 173 138, and as best seen in FIG. 2 comprises a sensing tip 22 electrically connected to a terminal 24 outside the pressure vessel 12 by means of a conductor 23 extending coaxially through the body 26 of the electrode. The sensing tip 22 and the coaxial conductor 23 are electrically isolated from the body 26 of the electrode by an annular space and an annular ceramic insulator 28, the latter also serving to secure the sensing tip to the body. The insulator 28 defines a sensing gap between the sensing tip 22 and the body 26 of the electrode 18, which gap is bridged in use by the fluid (water or steam) inside the pressure vessel 12 at the level of the electrode. Since the minimum electrical impedance or resistance of steam is substantially greater than the maximum electrical impedance or resistance of water, sensing the electrical impedance of the fluid bridging the sensing gap of the electrode 18 provides an indication of whether the electrode is immersed in water or in steam.

To sense the electrical impedance of the fluid bridging the sensing gap of the electrode 18, an alternating signal produced by an oscillator 30 is applied via a drive resistor 32 and a first wire 34 to the terminal 24 of the electrode 18. The oscillator 30 and the drive resistor 32 are disposed in a circuit housing or cabinet 36 which can be up to thirty meters away from the pressure vessel 12 and the boiler 14, since the immediate vicinity of the boiler represents a fairly harsh environment. A return or ground wire 38 connects the ground or zero volt power supply rail 40 of the oscillator 30 and the other circuitry in the cabinet 36 to the body 26 of the electrode 18.

It will be appreciated that the drive resistor 32 and the impedance of the fluid bridging the sensing gap of the electrode 18 together form a voltage divider, so that the alternating voltage at the terminal 24 is representative of the fluid impedance at the sensing gap of the electrode 18. This alternating voltage is applied via a further wire 42 to a rectifying amplifier 44 in the cabinet 36. The rectifying amplifier 44 therefore produces a DC output voltage V whose amplitude is substantially proportional to the impedance of the fluid at the sensing gap of the electrode 18, and this DC output signal is applied to one input of a first comparator 46. The other input of the comparator 46 is connected to receive a first reference voltage VR1, whose level is selected to lie about midway between the respective amplitudes of the DC output voltages produced by the rectifying amplifier 44 corresponding to the minimum sensed impedance of steam and to the maximum sensed impedance of water. Thus if the electrode 18 is immersed in steam, the output of the comparator 46 is at one level, typically logic O, while if the electrode 18 is immersed in water, the output of the comparator 46 switches to its other level, ie logic 1.

Each of the twelve electrodes 18 is connected to its own channel of impedance measuring (or discrimination) circuitry comprising circuit elements identical to the elements 32, 34, 38, 42, 44 and 46: this discrimination circuitry is collectively indicated at 50 in FIG. 1. Additionally, the electrodes 18 are normally divided into two vertically interleaved groups of six, ie containing odd and even numbered electrodes respectively, with each group having a respective common oscillator 30 and a respective common power supply (not shown): thus if one power supply or oscillator fails, the other group of electrodes and their discrimination circuitry 50 continue to operate to provide level sensing, albeit with reduced resolution.

The comparators 46 within the discrimination circuitry 50 drive a display 52 comprising twelve pairs of adjacent, horizontally aligned, indicator lights, typically LEDs, arranged to form two parallel vertical rows, one red, representing steam, and one green, representing water. To this end, and as shown in FIG. 2, the output of each comparator 46 is connected to its green (water) light 54, and via an inverter 56 to its red (steam) light 58: typically these connections may include suitable drive amplifiers, but these have been omitted for the sake of simplicity. Thus a typical normal indication provided by the display 52 would have the top six red lights on, and the bottom six green lights on, indicating that the water in the boiler 14 is at its normal level.

Clearly, if a green light comes on above a red light which is on, implying water above steam, a fault condition exists (and is in fact apparent from the green-above-red indication of display 52). However, to back this up, the outputs of the discrimination circuitry 50 are connected to validation circuitry 60, generally similar or analogous to that described in our United Kingdom Patent No 1 056 032, which operates a fault indicator light 62 in the display 52 if any one of the electrodes 18 appear to be sensing water above steam. To assist in this "water above steam" determination, the two sets of validation circuitry are cross-coupled with each other via the display 52.

In addition to the fault detection provided by the "water above steam" validation circuitry 60, the boiler water level sensing system 10 is provided with further fault detection circuitry which operates when the resistance sensed by an electrode 18 falls below a given level. Thus the Applicant's observations have shown that the minimum resistance of water, as sensed by a typical electrode 18 in a typical pressure vessel 12, is about 5 kilohms, so that a sensed resistance significantly lower than this is likely to be indicative of a fault. Accordingly, the DC output voltage V of each rectifying amplifier 44 is applied to one input of a respective second comparator 64, whose other input is connected to receive a second reference voltage VR2 selected to be equivalent to a sensed impedance of about 3 kilohms, as represented by the DC voltage produced by the rectifying amplifier 44. The comparator 64 thus produces a logic O output signal if its electrode 18 is immersed in water or steam, and a logic 1 output signal if the DC output signal produced by the rectifying amplifier 44 falls below VR2. The logic 1 output signals are operative, via respective OR gates 65 associated with the odd and even numbered electrode channels, to operate another fault indicator light 66 in the display 52.

The provision in each sensing channel of the second comparator 64, in combination with the use of the respective wires 34, 42 to connect the drive resistor 32 to the terminal 24 of the electrode 18, and the terminal 24 back to the rectifying amplifier 44 (instead of using just a single wire between the terminal 24 and a common terminal in the cabinet 36 connected both to the drive resistor 32 and to the rectifying amplifier 44), has the result that several different faults are rendered detectable. Thus each second comparator 64 will operate the fault indicator light 66 in the display 52 if either of its associated wires 34, 42 breaks or is short-circuited to ground (since both of these faults result in no output voltage from the rectifying amplifier 44), or if the sensing gap of an electrode 18 is short-circuited, eg by a build-up of an electrically conductive deposit on the ceramic insulator 28 (which again results in no output voltage from the rectifying amplifier 44). In addition, this wide range of fault detection is provided without requiring different wiring or circuit arrangements for steam-normal and water-normal electrodes, ie all twelve channels are substantially identical.

A number of modifications can be made to the described embodiment of the invention. For example, relay logic can be used in place of electronic logic, and displays other than that specifically described can be used. Also, there can be more electrodes 18 than twelve, typically up to sixteen, or less than twelve: in the latter case, the electrodes need not be divided into two interleaved groups, so only one set of discrimination circuitry 50 and validation circuitry 60 is employed. In the limit, only a single electrode need be used.

A further significant modification which can be made to the system 10 involves multiplexing. Thus the or each set of discrimination circuitry 50 can comprise a single channel of elements identical to the elements 44, 46 and 64, with a multiplexer at the input to the circuitry for sequentially connecting the input of the rectifying amplifier 44 to each of the associated electrodes in turn, ie on a time multiplexed basis; such multiplexers are indicated at 70 in FIG. 1. A demultiplexer (not shown), synchronised with the multiplexer 70 and located within the display 52, connects the respective outputs of the comparators 46 and 64 to respective latches or other memory devices, also forming part of the display 52, which are arranged to operate the indicator lights 52, 58 of the display.

Finally, fluid level sensing applications other than boiler water level sensing are possible, based on impedance measurements other than simple resistance measurements.

We claim:

1. A fluid level sensing system for sensing the level of the interface between a first fluid and a second fluid, the first fluid being beneath and of lower electrical impedance than the second fluid, the system comprising a vessel for containing the fluids, at least one sensor for sensing the electrical impedance of a fluid at a predetermined level in the vessel, and first comparator means for producing a first output signal when the sensed impedance falls below a first predetermined value lying between the normal minimum electrical impedance of the second fluid and the normal maximum electrical impedance of the first fluid, further comprising second comparator means for producing a second output signal when the sensed impedance falls below a second predetermined value lower than the normal minimum electrical impedance of the first fluid, said second output signal being indicative of a fault condition of the sensing system.

2. A system as claimed in claim 1, comprising a plurality of said sensors vertically spaced apart within the vessel.

3. A system as claimed in claim 2, comprising respective first and second comparator means associated with each of said sensors.

4. A system as claimed in claim 2, comprising one first and one second comparator means, and multiplexing means for multiplexing the first and second comparator means between the sensors on a time multiplexed basis.

5. A system as claimed in claim 2, comprising two first and two second comparator means, first multiplexing means for multiplexing one first comparator means and its associated second comparator means between the sensors of a first group of sensors on a time multiplexed basis, and second multiplexing means for multiplexing the other first comparator means and its associated second comparator means between the remaining sensors on a time multiplexed basis, the sensors of the first group comprising every alternate one of the vertically spaced sensors.

6. A system as claimed in claim 1, wherein the sensor comprises electrode means defining a predetermined gap bridged by the fluid in the vessel at the level of the gap.

7. A system as claimed in claim 6, comprising a reference impedance connected to the electrode means, and a reference signal source for applying an AC reference signal via the reference impedance to the electrode means, whereby the reference impedance and the fluid in the gap of the electrode means form a potential divider.

8. A system as claimed in claim 7, wherein the reference impedance, the reference signal source and the comparator means are disposed in a housing remote from the electrode means.

9. A system as claimed in claim 8, wherein the reference impedance is connected to an input terminal of the electrode means by a first wire, and the input terminal is connected back to the comparator means by a second wire.

* * * * *